United States Patent [19]
Chang

[11] Patent Number: 6,101,854
[45] Date of Patent: Aug. 15, 2000

[54] CONTROL LEVER LOCKING KIT

[76] Inventor: Martin Mingyang Chang, 1657 Huntington Dr., #323D, Duarte, Calif. 91010

[21] Appl. No.: 09/241,568

[22] Filed: Feb. 1, 1999

[51] Int. Cl.[7] .................................................. F16H 57/00
[52] U.S. Cl. ............................................. 70/202; 70/247
[58] Field of Search ...................... 70/198–203, 245–248, 70/237, 238, 254

[56] References Cited

U.S. PATENT DOCUMENTS

| | | | |
|---|---|---|---|
| 1,087,446 | 2/1914 | Hicks et al. | 70/201 |
| 1,185,285 | 5/1916 | Brewster | 70/247 |
| 1,280,896 | 10/1918 | Stroeh et al. | 70/203 |
| 1,309,925 | 7/1919 | Welsh | 70/202 |
| 1,329,644 | 2/1920 | Van Deventer et al. | 70/200 |
| 1,346,098 | 7/1920 | Maize | 70/200 |
| 1,444,935 | 2/1923 | Mokracek | 70/200 |
| 1,545,287 | 7/1925 | Stephenson | 70/203 |
| 1,581,035 | 4/1926 | Stephenson | 70/202 |
| 2,192,060 | 2/1940 | Wise | 70/203 |
| 4,347,412 | 8/1982 | Mihara et al. | 70/203 X |
| 5,038,667 | 8/1991 | Slater | 70/238 X |
| 5,473,918 | 12/1995 | Hixon | 70/238 X |
| 5,572,889 | 11/1996 | Ping-Hua | 70/203 X |
| 5,689,982 | 11/1997 | Chang | 70/247 |
| 5,778,710 | 7/1998 | Hu et al. | 70/203 X |
| 5,890,383 | 4/1999 | Chang | 70/247 |
| 5,950,464 | 9/1999 | Tonne | 70/247 |

FOREIGN PATENT DOCUMENTS

| | | | |
|---|---|---|---|
| 6421 | 11/1927 | Australia | 70/202 |
| 2611626 | 9/1988 | France | 70/245 |
| WO87/06897 | 11/1987 | WIPO | 70/247 |

*Primary Examiner*—Lloyd A. Gall

[57] ABSTRACT

A mechanical locking device in the kit form for the prevention of automotive vehicle theft by locking the gearshift control lever to the park position of this vehicle which comprises parts to form basically a clamp attached permanently to the lower portion of the lever, regardless of the size, shape, tilt angle and clearance of such lever, and a yoke and latching member capable of being lowered at least in part into and locked securely to the slot structure of various widths and lengths whereby the control lever is operated to prevent the movement of such control lever.

10 Claims, 3 Drawing Sheets

CONTROL LEVER LOCKING KIT

FIELD OF INVENTION

This invention relates to an anti-theft device, and particularly to a mechanical locking device in the kit form which can be universally adapted to a large variety of control levers operated in a slot structure such as the stick shift of an automobile equipped with an automatic transmission.

BACKGROUND OF THE INVENTION

This invention is an improvement of a mechanical locking device specified in U.S. patent application Ser. No. 08/988,827, which is an improvement over U.S. patent application Ser. No. 08/782,611, then allowed Apr. 16, 1989.

The allowed Patent Application '611 provides a gearshift lever locking device which comprises basically a relatively bulky main body housing most of the mechanical parts including sleeve, locking mechanism, hinge and others in a single unit. The bulky size of this main body requires a very large clearance in the gearshift lever which hindrance the applications of this anti-theft device in automobiles of relatively small gearshift lever clearances. The improvement made by Patent Application '827 moves the locking mechanism to the latching member and compresses the main body into a relatively small and simple sleeve and hinge structure. This modified anti-theft device can then be fitted into gearshift levers of very small clearance, resolving the first and foremost problem of adaptation and application of this type of anti-theft devices.

Despite the above improvement, however, the problems of adaptation are not limited to the clearance factor alone. Some of the others are: size of the lever, tilt angle between the lever and the slot, and length and width of such slot. That is: there are different sizes such as the diameters and shapes for the gearshift or control levers; the tilt angle between the lever and the slot may be different from 90 degrees; there may be different widths and lengths for the slot. A universally adaptable device should have mechanisms adjustable to all these factors. The present invention is developed to meet with this requirement.

Very briefly, I have found that the adaptation of an interlocking sleeve set with U-shaped channel of various diameters will take care of the size factor of the control lever. By means of a yoke structure slidably received in a latching member and moving the locking mechanism including the lock tumbler away from the base member, the tilt angle and slot length factors may be covered. Lastly, the introduction of a jacketed sheath structure will resolve the variations in the width of the slot. In this way, a new and versatile anti-theft device in the kit form is therefore resulted. I have also found that such a novel set of locking device may not only be applicable to gearshift lever of an automatic transmission for an automobile but also may be easily adaptable to gearshift lever of a conventional or standard shift automobile or even control levers of many machinery's operating in a slot structure. I therefore name this device as a control lever locking kit.

OBJECTS OF THE INVENTION

It is therefore an object of this invention to provide for a mechanical locking device which can be installed easily to a control lever operating along a slot structure. This device is attached rigidly onto the lower portion of the lever and locked to the slot structure therein to prevent the movement of same whenever placed at one end of this slot.

Another object of this invention is to provide for a locking device which is permanently attached on and readily retractable to a very close proximity of the control lever for the ease of storage and convenience of operation of this device.

A further object provides for a locking device which is self-arresting at a vertical position without any means of holding same thereon.

These and other objects and advantages of the present invention will become clear and apparent with respect to the following descriptions taken together with the accompanying drawings.

DESCRIPTION OF THE PREFERRED EMBODIMENTS

Figure 1:
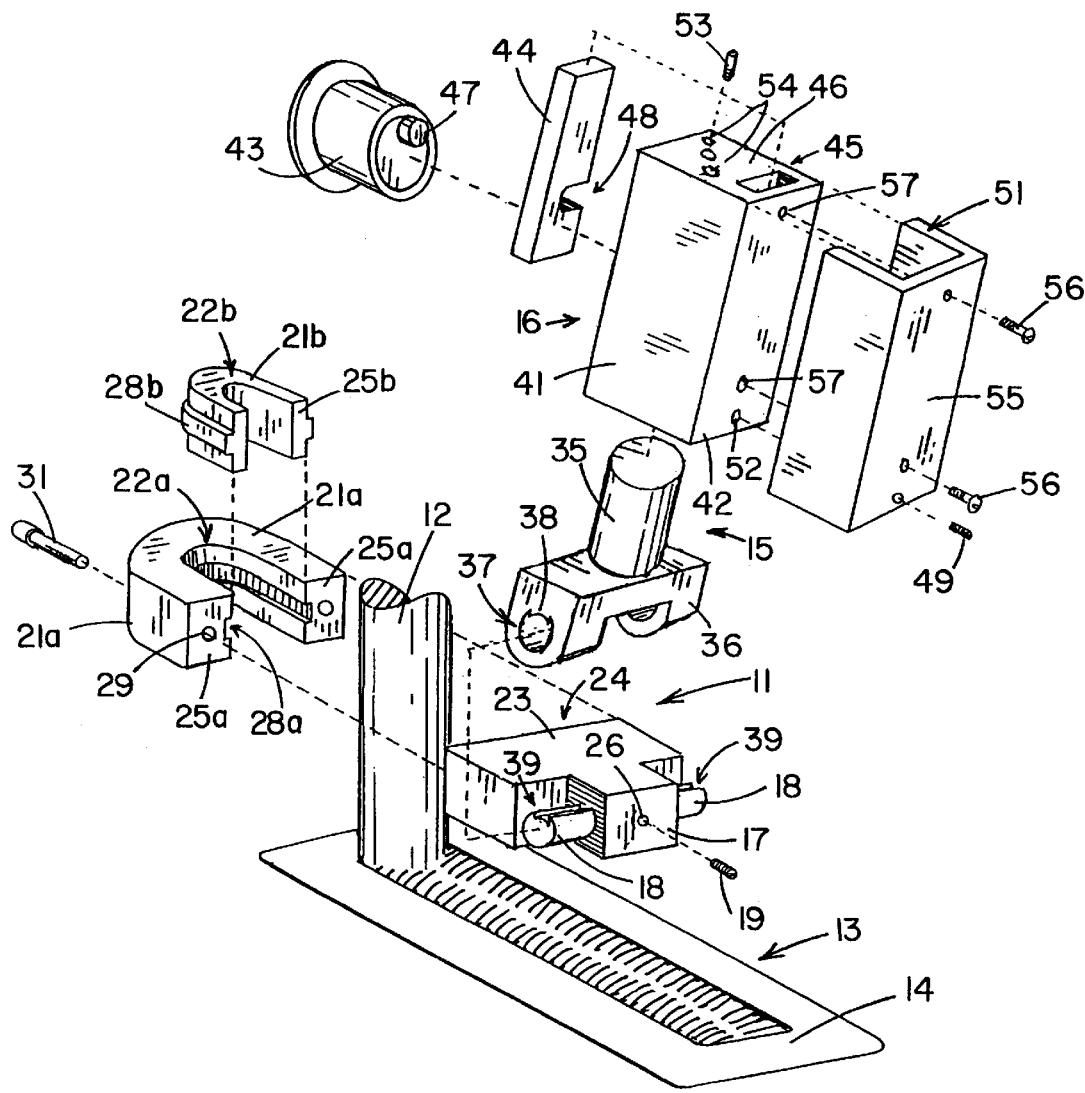
FIG. 1 is a perspective view of a preferred embodiment of the present invention shown in conjunction with the lower portion of a gearshift lever operated in a slot of automobile equipped with a standard floor shift transmission.

Referring to FIG. 1, a mechanical locking device is shown to comprise, first of all, a sleeve structure or clamping member 11 to be fastened around the lower portion of a control lever 12 placed at one end of a slot 13. The lever 12 is of the type which extends at a tilt angle approximately 90 degrees through the slot of a control panel or floorboard 14 of a machine such as an automotive vehicle. Secondly, the device comprises a yoke member 15 partially and slidably received in a latching member 16. This yoke member 15 is connected pivotally to a horizontal head 17 of the base 11 through a hinge 18 and the rear end of the yoke 15 is extruded into the latching member 16 which is provided with an axial passage (not shown) at the near end to receive same thereto. These parts, the clamping member 11, the yoke member 15 and the latching member 16, constitute the basic components of this novel anti-theft device.

The sleeve structure 11 is further composed of a set of at least two interlocking U-shaped sleeves, an outer sleeve 21a and an inner sleeve 21b, with U-shaped channels, 22a and 22b, and a matching base body 23 which has a flat vertical side 24 adapted to match with flat ends, 25a and 25b, on both sides of the sleeves 21a and/or 21b opposite from the curved portions of the sleeves thereof. The other end of the base 23 protrudes as a horizontal head 17 which is provided with a hinge structure 18 to the sides and a threaded hole 26 down the middle. The outer sleeve 21a is interlockable to inner sleeve 21b through a trough 28a therein and a mating lip structure 28b at the inner sleeve 21b. There are also a pair of horizontal holes 29 provided to outer sleeve 21a whose outer ends (not shown) are enlarged and counter sink. A one-way screw or bolt 31 is adapted to be received in each of these holes 29. These bolts are adapted to engage threaded holes (not shown) in the flat vertical sides 24 of the base 23 to closely surround the control lever 12 therein. The threaded hole 26 runs horizontally through the head 17 and the base 23 to reach the vertical side 24 in which a set screw 19 is received. When the sleeve structure 11 is properly positioned on the control lever 12 and bolt 31 tightened to base body 23, the set screw 19 can be tightened against the lever 12 to anchor the clamp 11 firmly and permanently in place. The proper positioning of the clamp 11 is such that it will allow the latching member 16 to be placed at least partially into the slot 13 and locked securely therein on the one hand and the shifting operations of the lever 12 freely in the slot 13 when the latching member 16 is placed at the vertical or standby position on the other hand.

Figure 2A:
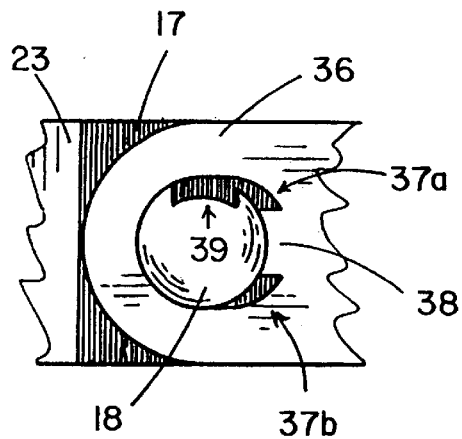
FIG. 2a is a side view of an enlarged partial portion of the sleeve head with the yoke placed at the horizontal position.
Figure 2B:
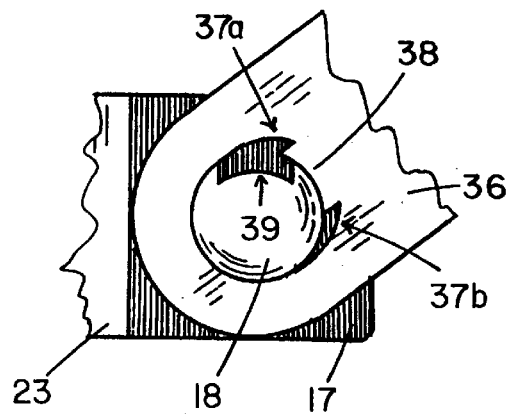
FIG. 2b is the same side view as FIG. 2a but with the yoke placed at approximately 45 degree angle from the horizontal position.
Figure 2C:
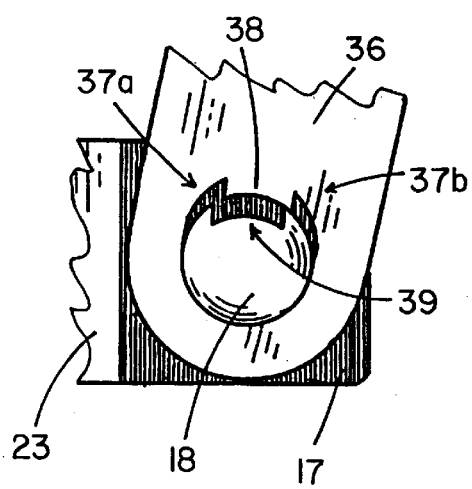
FIG. 2c is the same view as FIG. 2a but with the yoke placed at the vertical position.

The yoke member 15 comprises a circular column 35 at the rear and a pair of ears 36 at the front to engage hinge 18 with a circular channel 37 through these ears. As shown in FIG. 1 and FIG. 2a, this circular channel 37 has two sections of its periphery, 37a and 37b, cut-off to leave the uncut segment in between as a concave tooth 38 seemingly reaching out to the engaged hinge 18. Coupling with the concave tooth 18 is a trough 39 provided along the top edge of hinge 18. The width of the trough 39 matches that of the tooth 38 so that when yoke 15 is rotated to a vertical position, the tooth 38 will fall into the trough 39 by gravity to arrest the yoke 15 and therefore the latching member 16 at this vertical position. This special situation is shown in FIG. 2c and is termed as the standby position of this new locking device. With this novel feature, the conventional holding means for the standby operation such as the leaf spring 47 of U.S. patent application '827 and the clip 24 of U.S. Pat. No. 1,388,035 may all be eliminated.

The latching member of this device is composed of basically a rectangular block 41 which contains an axial passage (not shown) at the near end 42 matching in size and shape of that of column 35 to slidably receive same. As with the corresponding part in U.S. patent application '827, this latching member 16 also contains a mechanical locking mechanism such as a lock cylinder 43 and a lock tumbler 44, the latter being capable of reaching out of a window 45 at a far end 46 of the block 41. The lock tumbler 44 can normally be placed in two positions, i.e., a locking and an unlocking position, through the engagement of a cylinder pin 47 and tumbler slot 48, for the turn of a key (not shown) on the lock cylinder 43. Also provided to the rectangular block 41 is a set screw 49 and the corresponding threaded hole 52 at the near end 42, a terminal screw 53 and a series of threaded holes 54 at different heights from the window 45 on the far end 46 of the block 41.

Also shown in FIG. 1 next to the latching member 16 is a semi-sheath structure 55 which can be attached to the rectangular block 41 at the bottom by means of a pair of screws 56 through the structure to the corresponding threaded holes 57 on block 41. This semi-sheath 55 has an inner spacing 51 matching in length and width of block 41 so that it can be attached to the latter closely to add on to the overall width thereof for a good fit to the slot 13 much wider than the rectangular block 41 itself This invention will now be illustrated by describing the installation and use of the device on a control lever such as the gearshift lever of an automobile equipped with an automatic transmission.

The installation is effected by first placing the lever 12 at the far end of the slot 13, i.e., the end opposite to the "park" position. Then the outer sleeve 21a, with or without the interlocking inner sleeve 21b, and the base body 23 are placed at a position to surround the lower most portion of lever 12. The one-way bolts are tightened to hold the sleeve 21a firmly to base body 23 in this position. If the lever 12 has a diameter much smaller than that of the U-shaped spacing 22a, an inner sleeve 21b of a proper U-shaped channel shall be pre-inserted into the outer sleeve 21a to make a good fit for the lever 12. Otherwise, a single sleeve 21a may suffice. The set screw 33 is then inserted and tightened firmly to anchor the clamp 11 permanently onto lever 12. The lever is then placed to the "park" position. The overall length of the yoke 15 and latching member 16 is adjusted by loosening the set screw 49 and sliding the latching member 16 along the column 35 of the yoke 15 until the former can be lowered closely and smoothly into the slot 13. The set screw 49 is then tightened to complete the installation.

In case of a very wide slot 13, compared to the width of the block 41, a semi-sheath 55 of a proper width may be chosen to attach to the rectangular block 41 at this time for a good fit. It should be understood that in order to reduce the risk of prying off of the device by a thief, a good fit in the widths of the latching member to the slot is beneficial and necessary.

The use of this novel anti-theft device is such that, first of all, the operator will make sure that the lever is placed at one extreme end of the slot 13, such as the "park" position. Secondly, he will lift the latching member 16 from the standby position and place same into the slot 13 until the terminal screw 53 is rested on the rim of the panel 14. Finally, he will insert the key to the lock cylinder 43 and turn the lock tumbler 44 out of the window 45 to reach into the underside of the panel 14. This antitheft device is now locked into the slot 13 and the movement of the control or gearshift lever therein is prevented.

To release the locking device, the key is inserted with a turn so as to retract tumbler 44 back to the rectangular block 41. Thereupon the latching member 16 is lifted from the slot 13 upwardly until a vertical position is reached. By then, the tooth 38 will come to facing the trough 39 at hinge 18 and will fall into same automatically under gravity. This will arrest the latching member 16 in the vertical and standby position, ready for the next round of anti-theft operation. FIG. 2a through 2c show the relative positions of the tooth 38 and the trough 39 during this operation.

As a summary to the above descriptions of the preferred embodiment of this invention, a mechanical anti-theft device is presented in the kit form, which is composed of, basically, a sleeved base member or clamp 11 comprising an outer sleeve 21a and at least one interlocking inner sleeve 21b to be adaptable to the control levers of different shapes and sizes, a pivotally connected yoke member 15 and a sheathed latching member 16 receiving slidably in part of the yoke member 15 and henceforth adjustable in length to match with slots 13 of various sizes. The Provision for a series of the threaded terminal holes 54 further allows the adjustments of the device with respective to the thickness factor of panel 14. A novel and versatile locking device in the form of a kit is therefore presented.

While a specific embodiment of the invention has been described in details to illustrate the application of the principle, scope and spirit of the present invention, it will be understood that the invention may be embodied otherwise without departing from such principle, scope and spirit.

Figure 3A:
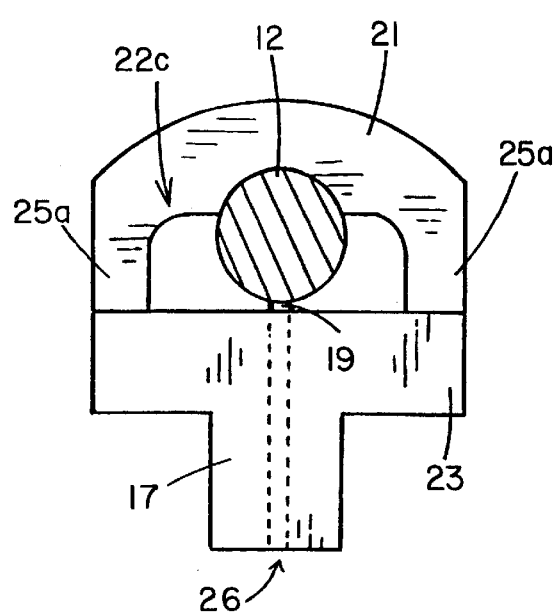
FIG. 3a is a top view of a modified U-shaped sleeve surrounding the control lever of a small circular diameter with the base body.
Figure 3B:
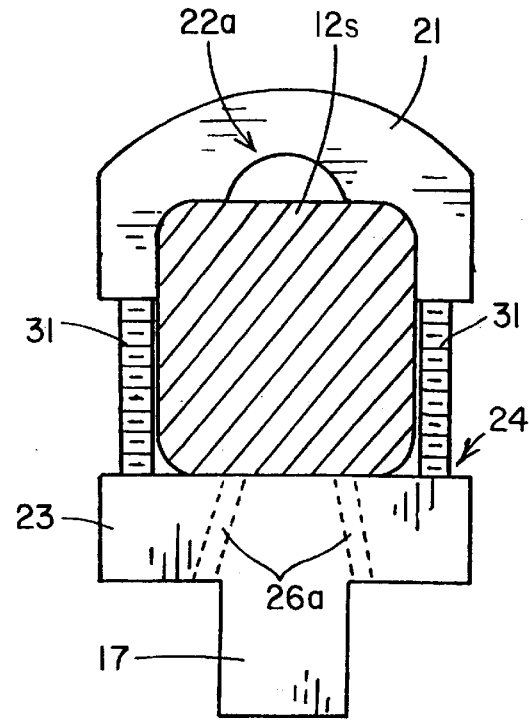
FIG. 3b is the same view as FIG. 3a but surrounding the control lever of a relatively large square cross section.

As an example of the variations and/or modifications of this invention, the sleeved base structure or clamp 11 with interlocking outer and inner sleeves may be replaced by a single sleeve structure 21 provided with U-shaped channels, 22a and 22c, of different sizes and curvatures superimposed on one another. This is shown in FIG. 3a and 3b. Thus, FIG. 3a shows that a control lever 12 of a small circular diameter (shown as the shaded area) matching that of the small U-shaped channel 22a is accommodated in the modified sleeve 21 and base body 23. FIG. 3b further shows that a control lever 12 of a large square shaped cross sectional area (shown as the shaded area) may also be accommodated by the same clamp structure 11. In the latter case, a pair of long bolts 31 should of course be used to tighten sleeve 21 to the base body 23. With this type of single sleeve, control levers 12 of any size and shape in between may all be adapted. On top of the modifications in sleeve structure, however, more than one set screw may be provided to the clamping structure for additional anchoring strength between the clamp and the control lever such as an additional pair of set screws (not shown) received in threaded holes 26a provided to the base body 23 to reach the vertical side 24 and therefore onto the surrounded control lever 12s, as shown in the double dotted lines in FIG. 3b.

Figure 4:
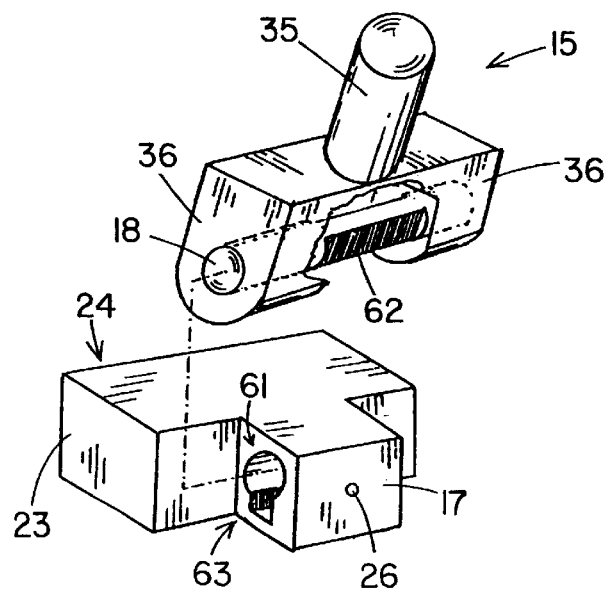
FIG. 4 is a perspective view of an enlarged base head provided with a key-hole passage receiving a hinge riveted to the yoke structure for another preferred embodiment of the present invention.

Another example for the modification of the preferred embodiments without departing from the scope and spirit of the present invention may be demonstrated with reference to FIG. 4. In stead of a stationary hinge structure 18 attached to the horizontal head 17 for the pivotal rotation and vertical arresting of the yoke 15 thereupon, this hinge structure 18 may be riveted securely to the ears 36 of the yoke structure 15 and rotates in a keyhole type of channel 61 across the head 17 for the same rotating and arresting purposes. In this present case, the central section 62 of the hinge 18, i.e., that section which rotates in the keyhole channel 61 of the head 17, is shaped to match the width of the slot 63 of the keyhole channel. This modified device will also be capable of arresting its own latching member at the vertical position for the standby operation without a conventional holding means and, at the same time, performs the normal function of rotation like a ordinary hinge does.

I claim:

1. A locking device comprising:
    a clamping member adapted to be securely attached to a control lever operated in a slot structure;
    a yoke member pivotally connected to said clamping member through a hinge structure;
    a latching member having an axial passage slidably receiving part of said yoke member and a locking mechanism equipped with a lock tumbler extendible out of and retractable into the domains of said latching member thereof; and
    means for attachment of said clamping member and holding of said latching member in a locking position and an unlocking position;
    said yoke member and said latching member being slidably adjustable in relative positions to match the length of said slot so that said latching member can be lowered at least partially into said slot and locked securely therein.

2. The device according to claim 1 wherein:
    said clamping member comprises a U-shaped outer sleeve and at least an interlocking inner sleeve having a U-shaped channel for surrounding said control lever and a matching base body having a flat vertical side facing said U-shaped sleeves and a horizontal head equipped with a hinge structure and at least one threaded horizontal hole reaching into said vertical side, said U-shaped outer sleeve being bolted firmly to said base body which is in turn anchored to said control lever by means of at least one set screw received in each said horizontal hole therein;
    said yoke member comprises a circular column at the far end to said clamping member and a pair of ears at the near end engaging said hinge structure with a specifically shaped channel providing a concave tooth in coupling with a trough provided along the top edge of said hinge structure to arrest said latching member at a vertical position thereof;
    said latching member comprises a rectangular block which is provided with an axial passage at the near end to said yoke member to slidably receive same and a locking mechanism and a lock tumbler contractible within the domains of said latching member and extendible out of same to engage the rim of said slot structure; and
    said means for attachment of said clamping member to said lever comprises a pair of one-way screws and at least one set screw duly positioned and tightened therein, said holding means includes a terminal screw placed at the far end of said rectangular block on a position allowing the locking of said latching member to the rim of said slot securely thereof.

3. The device as claimed in claim 1 wherein said clamping member comprises a U-shaped sleeve which is composed of at least two U-shaped channels of different sizes and curvatures superimposed over one another so as to be capable of accommodating said control lever of various sizes and shapes therein.

4. The device as claimed in claim 1 wherein said means for holding said latching member at the unlocking position comprises a hinge structure riveted to ears of said yoke member having a narrow middle section in line with the axis of said latching member matching a keyhole type of channel provided within a horizontal head to receive same, the width of said hinge at the narrow middle section matching in width of the trough portion of said keyhole so as to be capable of falling to and being arrested therein.

5. The device as claimed in claim 1 wherein said latching member is provided with a semi-sheath structure of a width larger than said latching member and means of the attachment of same thereto, said semi-sheath structure is shaped to be attached closely to the bottom portion of said latching member and at the meantime reducing the gap between said latching member and said slot thereof.

6. The device as claimed in claim 1 wherein said clamping member comprises a single U-shaped sleeve having at least two U-shaped channels of different sizes and curvatures superimposed over one another capable of accommodating said control lever of various sizes and shapes therein and a mating base body having a flat vertical side facing said U-shaped sleeve and a horizontal head equipped with a hinge structure and at least one horizontal threaded hole down the middle to reach to said vertical side, said U-shaped sleeve being firmly bolted to said base body which in turn being adapted to be anchored to said control lever by means of a set screw received in each of said threaded hole thereof.

7. A device as claimed in claim 6 wherein:
    said means for holding said latching member in the locking position comprises a terminal screw provided on the far end of said latching member at a distance above said extendable lock tumbler equivalent to the thickness of the rim of said slot structure; and
    said means for holding said latching member in the unlocking position comprises a hinge structure having a trough provided along the top edge of same and a specifically shaped channel through ears having a concave tooth matching in size of said trough so as to be capable of being arrested therein when said latching member is placed at the vertical position for the standby operation of same.

8. The device as claimed in claim 6 wherein said means for the holding of said latching member at the unlocking position comprises a hinge structure riveted to ears having a narrow middle section in line with the axis of said latching member and a keyhole type of channel provided within horizontal head to receive same, the width of said hinge at the narrow middle section matching in width of the trough portion of said keyhole so as to be capable of falling into and being arrested therein when said latching member is placed at the vertical position.

9. The device as claimed in claim 6 wherein said latching member is provided with a semi-sheath structure of a width larger than said latching member and means for the attachment of same thereto, said semi-sheath structure is shaped to be attached closely to the bottom portion of said latching member and at the meantime filling essentially the gap between said latching member and said slot thereof.

10. A locking device comprising;

a clamping member adapted to be securely fastened to a control lever operated in a slot structure comprising a U-shaped outer sleeve and an interlocking inner sleeve having a U-shaped channel for surrounding said control lever and a mating base body having a flat vertical side facing said U-shaped sleeves and a horizontal head equipped with a hinge structure and at least one horizontal threaded hole reaching to said vertical side, said interlocking U-shaped sleeves being bolted firmly to said base body which in turn being adapted to be anchored to said control lever by means of a set screw received in each of said threaded hole;

a yoke member having a cylindrical column in the far end relative to said base body and a pair of ears at the near end pivotally engaged to said hinge structure thereof;

a latching member shaped basically in the form of a rectangular block having an axial passage slidably receiving at least part of said cylindrical column at the near end of said yoke member and a locking mechanism having a lock tumbler extendible out of and retractable into the domains of said latching member at the far end thereof; and means for holding said latching member in a locking position and an unlocking position;

said yoke member and said latching member being adjustable in relative positions to be capable of matching the length of said slot so that said latching member can be lowered at least partially into said slot and locked securely therein.

* * * * *